United States Patent [19]

Bennison et al.

[11] Patent Number: 4,566,972
[45] Date of Patent: Jan. 28, 1986

[54] TREATMENT OF AQUEOUS SYSTEMS

[75] Inventors: John J. Bennison, Runcorn; Stuart W. Longworth; John G. Baker, both of Warrington, all of England

[73] Assignee: Dearborn Chemicals, Ltd., Widnes, England

[21] Appl. No.: 691,724

[22] Filed: Jan. 15, 1985

Related U.S. Application Data

[63] Continuation of Ser. No. 408,367, Aug. 16, 1982, abandoned.

[30] Foreign Application Priority Data

Aug. 18, 1981 [GB] United Kingdom ............. 8125161

[51] Int. Cl.$^4$ .............................................. C02F 5/12
[52] U.S. Cl. ................................... 210/698; 210/701; 252/82; 252/180
[58] Field of Search ............................ 210/698–701; 252/82, 86, 180, 181; 422/15–17

[56] References Cited

U.S. PATENT DOCUMENTS

| 2,723,956 | 11/1955 | Johnson | 210/698 |
| 3,520,813 | 7/1970 | Hanson et al. | 210/698 |
| 3,549,538 | 12/1970 | Jacklin | 252/82 |
| 3,630,937 | 12/1971 | Baum | 252/181 |
| 3,666,664 | 5/1972 | Lorenc et al. | 210/700 |
| 3,709,815 | 1/1973 | Boothe et al. | 210/701 |
| 3,709,816 | 1/1973 | Walker et al. | 210/701 |
| 3,804,770 | 4/1974 | Lorenc et al. | 252/180 |
| 3,959,167 | 5/1976 | Hwa et al. | 252/180 |
| 4,085,060 | 9/1975 | Vassileff | 252/180 |
| 4,118,318 | 10/1978 | Welder et al. | 210/701 |
| 4,255,259 | 3/1981 | Hwa | 210/699 |
| 4,288,327 | 9/1981 | Godlewski et al. | 210/698 |
| 4,306,991 | 12/1981 | Hwa et al. | 252/180 |

FOREIGN PATENT DOCUMENTS 2700347 1/1977 Fed. Rep. of Germany .
1015612 1/1966 United Kingdom .
1145386 3/1969 United Kingdom .
1414918 11/1975 United Kingdom .
2061249 5/1981 United Kingdom ............. 210/699

Primary Examiner—Peter Hruskoci
Attorney, Agent, or Firm—Mark T. Collins; William W. McDowell, Jr.

[57] ABSTRACT

A method of inhibiting and preventing scale in an aqueous system is described which comprises incorporating in the water at least one amino carboxylate having the formula:

$$RN[-(CH_2)_x-Z]_2$$

in which x is 1 or 2, R represents $-(CH_2)_x-Z$ or $-CH_2CH_2N[-(CH_2)_x-Z]_2$ and Z represents a $-COOH$ group, or a salt thereof, and at least one water-soluble copolymer possessing recurring units of the formula:

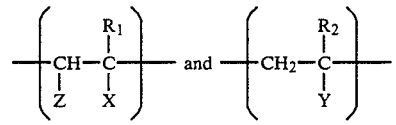

wherein $R_1$ represents hydrogen, lower alkyl or $-CH_2COOH$, $R_2$ represents hydrogen or lower alkyl, X represents $-COOH$ and Z represents hydrogen or $-COOH$, or X and Z together represent $-CO-O-CO-$, and Y represents $-SO_3H$, $-C_6H_5 SO_3H$ (para) or $-CONHQ(R_3)(R_4) SO_3H$ in which Q represents $-CH_2-$ or $-CH_2-CH_2-$ and $R_3$ and $R_4$ independently represent hydrogen, phenyl, substituted phenyl, C 1–12 linear or branched alkyl or C 3–12 cycloalkyl, or a salt thereof.

6 Claims, No Drawings

TREATMENT OF AQUEOUS SYSTEMS

This is a continuation, of application Ser. No. 408,367, filed Aug. 16, 1982 now abandoned.

The present invention relates to the treatment of aqueous systems, and, more particularly, to inhibiting and removing scale which forms in boilers.

It is well known that when water, espcially hard water, is heated, for instance in a boiler, scale forms on the surfaces of the boiler which come into contact with the water. It will be appreciated that boilers are frequently used to generate steam so that relatively high temperatures are employed and this increases the amount of scale which is formed.

A variety of different synthetic and naturally occurring chemicals has beem employed as additives to the water in order to try and reduce the formation of scale. The reason for this is that as the scale builds up there is a reduction in heat transfer across the heat exchange surfaces of the boiler and, in some instances, localised over-heating can occur. In serious cases of scale, the boiler can rupture.

As indicated, a variety of different chemicals including water soluble polymers, phosphonates and chelating agents has been used to combat scale formation. It has now been found, according to the present invention, that particularly good scale inhibition can be obtained by the use of a combination of a nitrogen-containing chelate compound with a water-soluble organic polymer possessing sulphonate groups. Accordingly, the present invention provides a method of treating water, in particular to reduce scale formation therefrom, which comprises incorporating in the water at least one amino carboxylate chelate compound having the formula:

$$RN[-(CH_2)_x-Z]_2$$

in which x is 1 or 2, R represents $-(CH_2)_x-Z$ or $-CH_2CH_2N[-(CH_2)_x-Z]_2$ and each Z individually represents a $-COOH$ group, or a salt thereof, and at least one water-soluble organic polymer possessing carboxylic (including carboxylic anhydride) and sulphonate groups as defined below. The use of this combination produces a synergistic effect.

While it is possible to incorporate the chelate and polymer separately it will be appeciated that it will generally be more convenient to incorporate them together in the form of a composition. Accordingly, the present invention also provides a composition suitable for addition to water to inhibit scale formation comprising at least one amino carboxylate compound of the general formula given above and at least one of the said water-soluble organic polymers.

The preferred chelate compounds used in the present invention include ethylene diamine tetraacetic acid (EDTA) and nitrilo tri-acetic acid (NTA). In other words, in these preferred compounds, x is 1.

The polymers used in the present invention are vinyl addition type copolymers possessing recurring units of the formula:

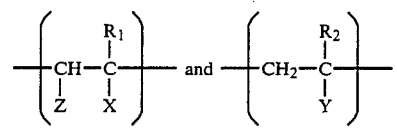

wherein $R_1$ represents hydrogen or lower alkyl, i.e. of 1 to 6 carbon atoms, preferably 1 to 4 carbon atoms, or $-CH_2COOH$, $R_2$ represents hydrogen or lower alkyl, X represents $-COOH$ and Z represents hydrogen or $-COOH$ or X and Z together represent $-CO-O-CO$, and Y represents $-SO_3H$, $-C_6H_5SO_3H$ (para) or $-CONHQ(R_3)(R_4)SO_3H$ in which Q represents $-CH_2-$ or $-CH_2-CH_2-$ and $R_3$ and $R_4$ independently represent hydrogen, phenyl, substituted phenyl, $C_{1-12}$ linear or branched alkyl or $C_{3-12}$ cycloalkyl, especially methyl. Preferred such Y radicals include $-CONH-C(CH_3)(R_3)-CH_2-SO_3H$, especially where $R_3$ represents methyl, and $-CONHCH_2SO_3H$.

The molar proportion of the two types of recurring unit is generally from 5 to 95 to 95 to 5, more particularly from 25 to 75 to 75 to 25 and especially about 50 to 50 or the sulphonate monomer unit is in excess. The polymers generally possess a molecular weight from 500 to 750 000 and in particular from 1 000 to less than 10 000 and especially from 4 000 to 6 000.

Preferred copolymers for use in the present invention include a copolymer of methacrylic acid and 2-acrylamido-2-methyl-propane sulphonic acid (AMPS) in the form of, in particular, the sodium salt, especially in a molar ratio of about 1:1 and having a molecular weight of about 5 000, and a copolymer of styrene sulphonic acid and maleic acid in the form of, in particular, the sodium salt, especially in a molar ratio of about 3:1 and having a molecular weight of about 4,500.

The first units of the copolymers are generally derived from ethylenically unsaturated acids such as maleic acid (or anhydride), acrylic acid and methacrylic acid. The second units of the copolymers are generally derived from ethylenically unsaturated monomers; these monomers may either contain the sulphonate group or this group can be introduced by sulphonation of the copolymer.

The polymers used in the present invention can be obtained from the monomers using conventional polymerization processes. The styrene sulphonate polymers can be prepared by sulphonating a copolymer of styrene and maleic anhydride with a sulphur trioxide-organic phosphorus compound (see, for example, U.S. Pat. No. 3,072,618).

The nitrogen containing compounds and polymers are generally used in the form of alkali metal, especially sodium or potassium, ammonium, or lower amine salts although the use of the free acids, zinc and other salts of either or both is not excluded.

In general, the nitrogen compound and polymer are used in the weight ratios (as free acid) from 50:1 to 1:10, especially from 30:1 to 10:1 and more especially about 16:1.

The dosage of nitrogen containing compound and polymer depends, to some extent, on the nature of the aqueous system to be treated. In particular, the dosage will depend upon the extent of the calcium concentration i.e. hardness of the water. In general, however, it can be said that the concentration in the feed is from 0.1 to 1 000 ppm of additive and, more particularly, from 0.3 to 100 ppm. A particularly preferred concentration is about 6 ppm of nitrogen containing compound and about 0.5 ppm of polymer.

It will be appreciated that other ingredients customarily employed in boiler water treatment such as phosphates, lignin derivatives, tannins, and other polymers can also be employed. In particular, it may be desirable to incorporate an acrylate or metacrylate polymer. Of course, it is possible to use more than one of the said nitrogen containing compounds and said polymers if desired.

The compositions of the present invention will normally be in the form of an aqueous solution although other forms such as powders are not excluded. Typically, such solutions wll generally contain 5 to 60%, preferably 15 to 35%, especially 20 to 30%, by weight of the nitrogen-containing compound and, correspondingly, 0.15 to 6% by weight of polymer.

The following test results further illustrate the present invention.

LABORATORY TEST

A synthetic water of 400 ppm calcium hardness (as $CaCO_3$), 400 ppm M.alkalinity and pH of 9.0 was circulated round a glass apparatus containing a silica-sheathed electrical heater and a cooling condenser. The power supplied to the heater and the flow of cooling water were adjusted to give a water temperature of 65° C. After six hours, the amount of calcium carbonate scale adhering to the heater was measured. Tests were run in the absence of any additive (blank) and in a comparative manner in the presence of the polymer (3:1 styrene sulphonic/maleic acid copolymer, sodium salt, M.W. about 4 500), alone, the chelant alone (EDTA) and a mixture of the two. Percent scale prevention was then calculated from the amount of scale on the heater, compared to the amount with the blank which was used as a basis of 0% reduction. The results are shown below.

| Additive | Dose Rate | % Scale Reduction |
| --- | --- | --- |
| Polymer | 1.5 ppm | 3 |
| Chelant | 24.5 ppm | 61 |
| Formulation A | | |
| Polymer | } 100 ppm | 71 |
| Chelant | | |
| Formulation A: | | |
| Polymer | 1.5 weight % | |
| Chelant | 24.5 weight % - as free acid | |
| Water | 74 weight % | | i.e. a 16:1 weight ratio of chelant to polymer.

Thus, by simple additive mixing Formulation A would be expected to give a scale reduction figure of 64%. The actual figure obtained (71%) thus indicates a synergistic effect, and certainly shows that the formulation is a scale inhibitor.

It will be appreciated that sub-stoichiometric quantities (relative to $CA^{++}$) were used. Accordingly, the percentage reduction obtained is less than would be obtained in practice where, in general at least stoichiometric quantities are employed.

FIELD TRIAL

During the course of a trial in which Formulation A was added to a commercial boiler using 22 parts of the formulation per ppm of $Ca^{++}$ in the feed water, samples of boiler and feed water were obtained and analysed in our laboratories. From these analyses the following conclusions were reached:

(a) Over 6 months of the trial the average Total Dissolved Solids content of the boiler water was 2 600 ppm, and that of the feed water was 92 ppm. This gives an average Cycles of Concentration figure of 28.3.

(b) Over this same period the average calcium hardness of the feed water was 3.33 ppm. Thus the calcium hardness level in the boiler should theoretically be 94 ppm.

(c) At the start of this trial the average boiler water calcium hardness level was 21 ppm.

(d) During the last two months of the trial the average boiler water calcium hardness level was 112 ppm.

Thus taking the theoretical calcium level as 100%, at the start of the trial 22% of the calcium was recovered, in the boiler water, and at the conclusion of the trial 119% of the calcium in the boiler water was recovered.

It is believed that at the start of the trial scale was being deposited, and at the conclusion scale prevention was complete and old scale deposits were being removed, i.e. in-service cleaning are being achieved.

We claim:

1. A method of treating water in an aqueous steam generating boiler system to inhibit calcium carbonate scale formation which comprises incorporating in the water ethylenediaminetetraacetic acid or a salt thereof and a water-soluble copolymer of maleic acid and styrene sulfonic acid or a salt thereof in a weight ratio of ethylenediametetracetic acid or salt to copolymer or salt of from 50:1 to 1:10, said copolymer possessing a molecular weight of from 1,000 to less than 10,000 and maleic acid and styrene sulfonic acid recurring units in a molar proportion of about 75:25 to 5:95.

2. A method according to claim 1 in which in the copolymer the recurring units containing sulphonate are in excess.

3. A method according to claim 1 in which the weight ratio of the ethylenediaminetetraacetic acid or salt to the copolymer or salt is from 30:1 to 10:1.

4. A composition suitable for inhibition of calcium carbonate scale in an aqueous steam generating boiler system which comprises ethylenediaminetetraacetic acid or a salt thereof and a water-soluble copolymer of maleic acid and styrene sulfonic acid or a salt thereof possessing a molecular weight of from 1,000 to less than 10,000 and maleic acid and styrene sulfonic acid recurring units in a molar proportion of 75:25 to 5:95, said composition having a weight ratio of ethylenediaminetetraacetic acid or salt to copolymer or salt of from 50:1 to 1:10.

5. A composition according to claim 4 in which the weight ratio of ethylenediaminetetraacetic acid or salt to the copolymer or salt is from 30:1 to 10:1.

6. A composition according to claim 4 which is in the form of an aqueous solution containing 5 to 60% by weight of ethylenediaminetetraacetic acid or salt thereof and 0.15 to 6% by weight of the copolymer or salt thereof.

* * * * *